(12) United States Patent
Yero

(10) Patent No.: US 7,467,253 B2
(45) Date of Patent: Dec. 16, 2008

(54) CYCLE COUNT STORAGE SYSTEMS

(75) Inventor: Emilio Yero, Sunnyvale, CA (US)

(73) Assignee: SanDisk Corporation, Milpitas, CA (US)

( * ) Notice: Subject to any disclaimer, the term of this patent is extended or adjusted under 35 U.S.C. 154(b) by 137 days.

(21) Appl. No.: 11/404,454

(22) Filed: Apr. 13, 2006

(65) Prior Publication Data

US 2007/0245067 A1   Oct. 18, 2007

(51) Int. Cl.
G06F 12/00 (2006.01)
(52) U.S. Cl. ............ 711/103; 365/185.33; 365/185.29; 365/185.3
(58) Field of Classification Search ................. 711/103, 711/154; 365/185.01, 185.33, 185.3, 185.29
See application file for complete search history.

(56) References Cited

U.S. PATENT DOCUMENTS

| | | | |
|---|---|---|---|
| 5,043,940 A | 8/1991 | Harari | ........................ 365/168 |
| 5,070,032 A | 12/1991 | Yuan et al. | |
| 5,095,344 A | 3/1992 | Harari | |
| 5,172,338 A | 12/1992 | Mehrotra et al. | ............. 365/185 |
| 5,268,870 A | 12/1993 | Harari | |
| 5,313,421 A | 5/1994 | Guterman et al. | |
| 5,315,541 A | 5/1994 | Harari et al. | |
| 5,343,063 A | 8/1994 | Yuan et al. | |
| 5,532,962 A | 7/1996 | Auclair et al. | |
| 5,570,315 A | 10/1996 | Tanaka et al. | |
| 5,661,053 A | 8/1997 | Yuan | |
| 5,774,397 A | 6/1998 | Endoh et al. | |
| 5,798,968 A | 8/1998 | Lee et al. | |
| 5,887,145 A | 3/1999 | Harari et al. | ................. 395/282 |
| 5,890,192 A | 3/1999 | Lee et al. | |
| 5,909,449 A | 6/1999 | So et al. | |
| 5,930,167 A | 7/1999 | Lee et al. | |
| 6,028,794 A | 2/2000 | Nakai et al. | ............ 365/185.29 |
| 6,046,935 A | 4/2000 | Takeuchi et al. | |
| 6,222,762 B1 | 4/2001 | Guterman et al. | |
| 6,345,001 B1 | 2/2002 | Mokhlesi | |
| 6,426,893 B1 | 7/2002 | Conley et al. | |
| 6,456,528 B1 | 9/2002 | Chen | |
| 6,522,580 B2 | 2/2003 | Chen et al. | |
| 6,604,168 B2 * | 8/2003 | Ogawa | ....................... 711/103 |
| 6,643,187 B2 * | 11/2003 | Mokhlesi | ............... 365/185.33 |
| 6,763,424 B2 | 7/2004 | Conley | |
| 6,831,865 B2 | 12/2004 | Chang et al. | |
| 6,850,443 B2 | 2/2005 | Lofgren et al. | |
| 6,922,364 B2 * | 7/2005 | Kojima | .................. 365/185.33 |
| 6,925,007 B2 | 8/2005 | Harari et al. | ........... 365/185.15 |
| 6,931,480 B2 * | 8/2005 | Swaminathan | ............... 711/103 |
| 6,944,063 B2 | 9/2005 | Chen et al. | |

(Continued)

OTHER PUBLICATIONS

Nozaki et al., "A 1-Mb EEPROM with MONOS Memory Cell for Semiconductor Disk Application," *IEEE Journal of Solid State Circuits*, vol. 26, No. 4, Apr. 1991, pp. 497-501.

(Continued)

*Primary Examiner*—Pierre-Michel Bataille
(74) *Attorney, Agent, or Firm*—Vierra Magen Marcus & DeNiro LLP

(57) ABSTRACT

A hot count records the number of erase operations experienced by a block. The hot count is stored in an overhead data area of the block and is updated by circuits located on the same substrate as the block. Where a memory has two or more planes, each plane has circuits for updating hot counts.

18 Claims, 11 Drawing Sheets

U.S. PATENT DOCUMENTS

| | | | |
|---|---|---|---|
| 7,200,708 B1* | 4/2007 | Kreifels | 711/103 |
| 2004/0083335 A1 | 4/2004 | Gonzalez et al. | |
| 2004/0151031 A1 | 8/2004 | Tanaka | |
| 2005/0047216 A1 | 3/2005 | Kojima | 365/185.33 |
| 2005/0091445 A1 | 4/2005 | Chang et al. | |
| 2005/0201153 A1* | 9/2005 | Swaminathan | 365/185.11 |

OTHER PUBLICATIONS

International Searching Authority (EPO), "Notification of Transmittal of the International Search Report and the Written Opinion of the International Searching Authority, or the Declaration," mailed in corresponding International Application No. PCT/US2007/064287 on Aug. 27, 2007, 13 pages.

USPTO, Office Action mailed on Dec. 11, 2007 in related U.S. Appl. No. 11/404,672, 13 pages.

Final Office Action dated May 23, 2008, U.S. Appl. No. 11/404,672, filed Apr. 13, 2006.

Response to Final Office Action dated Jul. 28, 2008, U.S. Appl. No. 11/404,672, filed Apr. 13, 2006.

Notice of Allowance and Fee(s) Due dated Sep. 19, 2008, U.S. Appl. No. 11/404,672, filed Apr. 13, 2006.

* cited by examiner

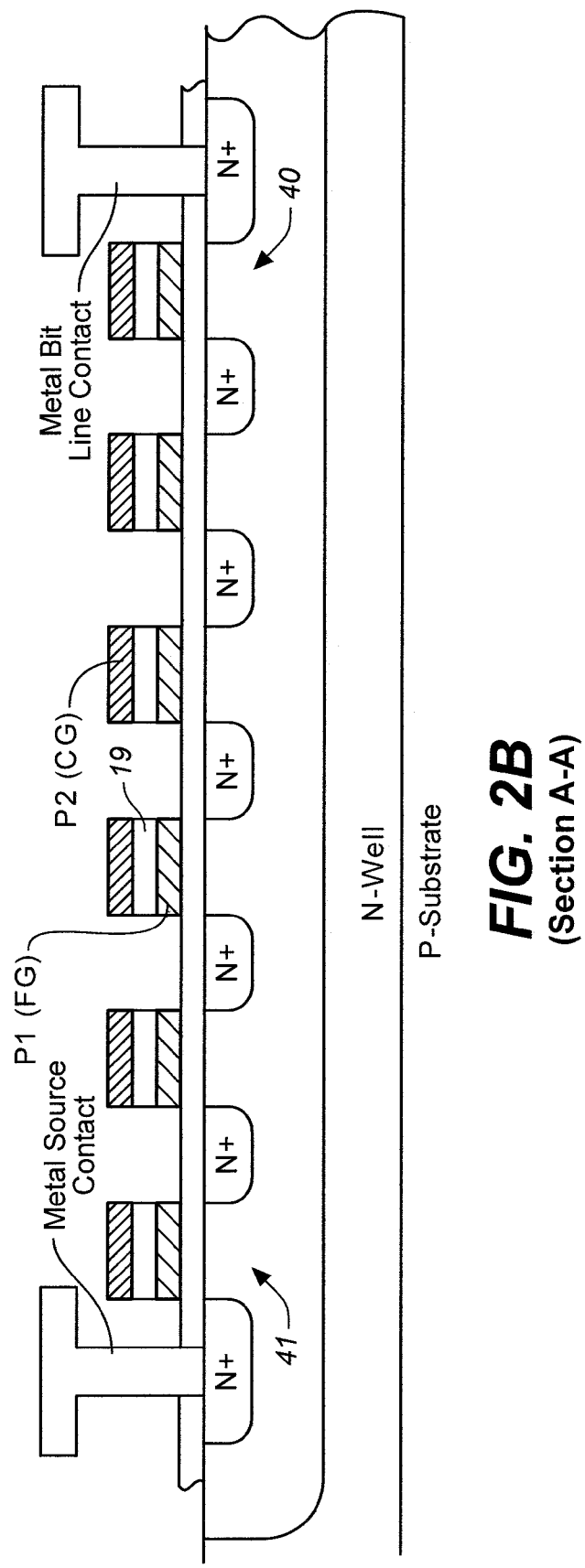
FIG. 2B (Section A-A)

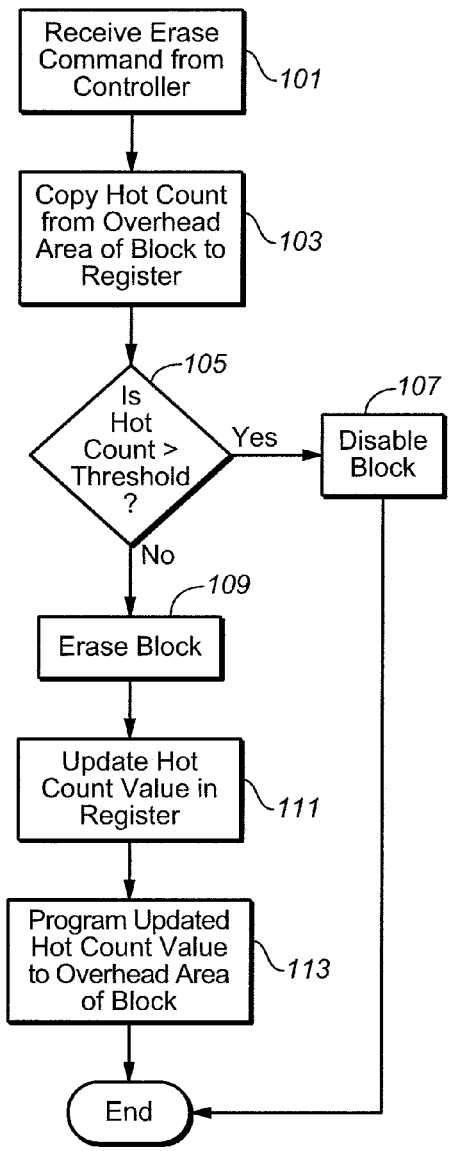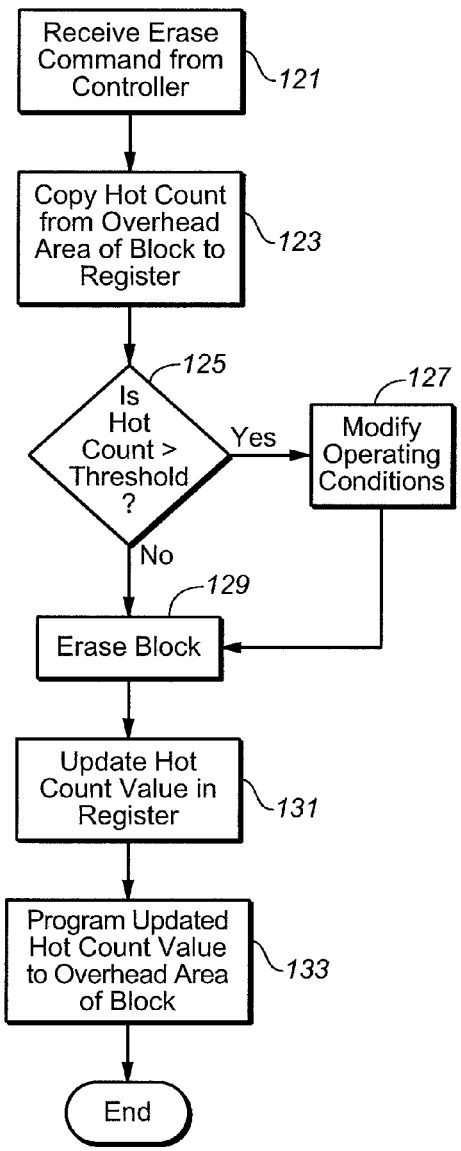
*FIG. 10*     *FIG. 11*

CYCLE COUNT STORAGE SYSTEMS

CROSS-REFERENCE TO RELATED APPLICATION

This application is related to U.S. patent application Ser. No. 11/404,672, entitled, "Cycle Count Storage Methods", filed on the same day as the present application; which application is incorporated in its entirety by reference as if fully set forth herein.

BACKGROUND OF THE INVENTION

This invention relates generally to non-volatile memory systems and their operation. All patents, published patent applications and other materials referred to in this application are hereby incorporated by reference in their entirety for all purposes.

There are many commercially successful non-volatile memory products being used today, particularly in the form of small form factor cards, which employ an array of flash EEPROM (Electrically Erasable and Programmable Read Only Memory) cells formed on one or more integrated circuit chips. A memory controller, usually but not necessarily on a separate integrated circuit chip, interfaces with a host to which the card is removably connected and controls operation of the memory array within the card. Such a controller typically includes a microprocessor, some non-volatile read-only-memory (ROM), a volatile random-access-memory (RAM) and one or more special circuits such as one that calculates an error-correction-code (ECC) from data as they pass through the controller during the programming and reading of data. Some of the commercially available cards are CompactFlash™ (CF) cards, MultiMedia cards (MMC), Secure Digital (SD) cards, Smart Media cards, personnel tags (P-Tag) and Memory Stick cards. Hosts include personal computers, notebook computers, personal digital assistants (PDAs), various data communication devices, digital cameras, cellular telephones, portable audio players, automobile sound systems, and similar types of equipment. Besides the memory card implementation, this type of memory can alternatively be embedded into various types of host systems.

Two general memory cell array architectures have found commercial application, NOR and NAND. In a typical NOR array, memory cells are connected between adjacent bit line source and drain diffusions that extend in a column direction with control gates connected to word lines extending along rows of cells. A memory cell includes at least one storage element positioned over at least a portion of the cell channel region between the source and drain. A programmed level of charge on the storage elements thus controls an operating characteristic of the cells, which can then be read by applying appropriate voltages to the addressed memory cells. Examples of such cells, their uses in memory systems and methods of manufacturing them are given in U.S. Pat. Nos. 5,070,032; 5,095,344; 5,313,421; 5,315,541; 5,343,063; 5,661,053 and 6,222,762.

The NAND array utilizes series strings of more than two memory cells, such as 16 or 32, connected along with one or more select transistors between individual bit lines and a reference potential to form columns of cells. Word lines extend across cells within a large number of these columns. An individual cell within a column is read and verified during programming by causing the remaining cells in the string to be turned on hard so that the current flowing through a string is dependent upon the level of charge stored in the addressed cell. Examples of NAND architecture arrays and their operation as part of a memory system are found in U.S. Pat. Nos. 5,570,315; 5,774,397; 6,046,935; 6,456,528 and 6,522,580.

The charge storage elements of current flash EEPROM arrays, as discussed in the foregoing referenced patents, are most commonly electrically conductive floating gates, typically formed from conductively doped polysilicon material. An alternate type of memory cell useful in flash EEPROM systems utilizes a non-conductive dielectric material in place of the conductive floating gate to store charge in a non-volatile manner. One such a cell is described in an article by Takaaki Nozaki et al., "A 1-Mb EEPROM with MONOS Memory Cell for Semiconductor Disk Application" IEEE Journal of Solid-State Circuits, Vol. 26, No. 4, April 1991, pp. 497-501. In one example, a triple layer dielectric formed of silicon oxide, silicon nitride and silicon oxide (ONO) is sandwiched between a conductive control gate and a surface of a semi-conductive substrate above the memory cell channel. The cell is programmed by injecting electrons from the cell channel into the nitride, where they are trapped and stored in a limited region, and erased by injecting hot holes into the nitride. Several specific cell structures and arrays employing dielectric storage elements are described in U.S. Pat. No. 6,925,007.

Individual flash EEPROM cells store an amount of charge in a charge storage element or unit that is representative of one or more bits of data. The charge level of a storage element controls the threshold voltage (commonly referenced as $V_T$) of its memory cell, which is used as a basis of reading the storage state of the cell. A threshold voltage window is commonly divided into a number of ranges, one for each of the two or more storage states of the memory cell. These ranges are separated by guardbands that include a nominal sensing level that allows determining the storage states of the individual cells. These storage levels do shift as a result of charge disturbing programming, reading or erasing operations performed in neighboring or other related memory cells, pages or blocks. Error correcting codes (ECCs) are therefore typically calculated by the controller and stored along with the host data being programmed and used during reading to verify the data and perform some level of data correction if necessary. Also, shifting charge levels can be restored back to the centers of their state ranges from time-to-time, before disturbing operations cause them to shift completely out of their defined ranges and thus cause erroneous data to be read. This process, termed data refresh or scrub, is described in U.S. Pat. Nos. 5,532,962 and 5,909,449. Multiple state flash EEPROM structures using floating gates and their operation are described in U.S. Pat. Nos. 5,043,940 and 5,172,338. Selected portions of a multi-state memory cell array may also be operated in two states (binary) for various reasons, in a manner described in U.S. Pat. Nos. 5,930,167 and 6,456,528.

Memory cells of a typical flash EEPROM array are divided into discrete blocks of cells that are erased together. That is, the block (erase block) is the erase unit, a minimum number of cells that are simultaneously erasable. Each erase block typically stores one or more pages of data, the page being the minimum unit of programming and reading, although more than one page may be programmed or read in parallel in different sub-arrays or planes. Each page typically stores one or more sectors of data, the size of the sector being defined by the host system. An example sector includes 512 bytes of host data, following a standard established with magnetic disk drives, plus some number of bytes of overhead information about the host data and/or the erase block in which they are stored. Such memories are typically configured with 16, 32 or more pages within each erase block, and each page stores one or more sectors of host data. Host data may include user data from an application running on the host and data that the host generates in managing the memory such as FAT (file allocation table) and directory data.

In order to increase the degree of parallelism during programming host data into the memory array and reading host data from it, the array is typically divided into sub-arrays, commonly referred to as planes, which contain their own data registers and other circuits to allow parallel operation such that sectors of data may be programmed to or read from each of several or all the planes simultaneously. An array on a single integrated circuit may be physically divided into planes, or each plane may be formed from a separate one or more integrated circuit chips. Examples of such a memory implementation are described in U.S. Pat. Nos. 5,798,968 and 5,890,192.

In some memory systems, the physical memory cells are also grouped into two or more zones. A zone may be any partitioned subset of the physical memory or memory system into which a specified range of logical block addresses is mapped. For example, a memory system capable of storing 64 Megabytes of data may be partitioned into four zones that store 16 Megabytes of data per zone. The range of logical block addresses is then also divided into four groups, one group being assigned to the erase blocks of each of the four zones. Logical block addresses are constrained, in a typical implementation, such that the data of each are never written outside of a single physical zone into which the logical block addresses are mapped. In a memory cell array divided into planes (sub-arrays), which each have their own addressing, programming and reading circuits, each zone preferably includes erase blocks from multiple planes, typically the same number of erase blocks from each of the planes. Zones are primarily used to simplify address management such as logical to physical translation, resulting in smaller translation tables, less RAM memory needed to hold these tables, and faster access times to address the currently active region of memory, but because of their restrictive nature can result in less than optimum wear leveling.

To further efficiently manage the memory, erase blocks may be linked together to form virtual blocks or metablocks. That is, each metablock is defined to include one erase block from each plane. Use of the metablock is described in U.S. Pat. No. 6,763,424. The metablock is identified by a host logical block address as a destination for programming and reading data. Similarly, all erase blocks of a metablock are erased together. The controller in a memory system operated with such large blocks and/or metablocks performs a number of functions including the translation between logical block addresses (LBAs) received from a host, and physical block numbers (PBNs) within the memory cell array. Individual pages within the blocks are typically identified by offsets within the block address. Address translation often involves use of intermediate terms of a logical block number (LBN) and logical page.

Data stored in a metablock are often updated. The likelihood of updates occurring in a metablock increases as the data capacity of the metablock increases. Updated sectors of one metablock are normally written to another metablock. The unchanged sectors are usually also copied from the original to the new metablock, as part of the same programming operation, to consolidate the data. Alternatively, the unchanged data may remain in the original metablock until later consolidation with the updated data into a single metablock again. Once all the data in a metablock become redundant as a result of updating and copying, the metablock is put in a queue for erasing.

As an erase block goes through successive program and erase cycles, it experiences wear that can eventually cause the block to fail. In some cases, a controller monitors this wear by keeping a hot count that indicates how many erase cycles a block has undergone. Because a flash memory block must be erased before it can be programmed, the number of erase operations experienced is generally equal to the number of programming operations experienced. The number of erase operations experienced is generally a good measure of the wear experienced by the block. In some cases, the controller uses the hot count for wear leveling purposes to try to ensure that blocks in a memory array wear at approximately the same rate. However, maintaining hot count values for all the blocks of a memory array uses valuable controller resources. In particular, where the memory array contains a large number of blocks, the burden of maintaining and updating hot counts may be significant. Also, the communication associated with monitoring and updating hot counts may use some of the communication capacity between a controller and memory chips, thus slowing other communication and reducing access times.

SUMMARY OF THE INVENTION

Dedicated circuits on the same chip or chips as a memory array allow hot counts to be maintained independently of a controller. This leaves the controller free to perform other functions, thus improving performance. By maintaining the hot count in the nonvolatile memory using on-chip circuits, the danger of losing the hot count value due to a loss of power is reduced.

A hot count is maintained in an overhead data area of a block in the memory array. The hot count is copied to a register when an erase command is received for the block. The hot count is then compared with one or more threshold values to determine what actions, if any, should be taken. Such actions may include disabling the block or modifying some operating conditions of the block, such as voltages or time periods used in accessing the block. Generally, the block is erased and the hot count is updated. Then the updated hot count is written back to the overhead data area of the block. If the block is disabled then another block may be selected and the disabled block is flagged.

In memories using multi level storage for higher storage density, a hot count may be stored in binary format even though host data in the same page are stored in multi level format. This provides a low risk of corruption of the hot count value, which is particularly desirable where no ECC data are generated for the hot count value.

In memories having multiple planes, dedicated circuits are provided with each plane for updating hot counts in the blocks of their respective planes. This may be done rapidly, on-chip, without requiring controller resources and with a high degree of reliability.

BRIEF DESCRIPTION OF THE DRAWINGS

FIG. 2B shows a cross section of a NAND string of the NAND memory cell of FIG. 2A;

FIG. 10 shows a flowchart for a block erase operation that disables the block if the hot count exceeds a threshold;

FIG. 11 shows a flowchart for a block erase operation that modifies operating conditions of the block if the hot count exceeds a threshold.

DESCRIPTION OF EXEMPLARY EMBODIMENTS

Figure 1:
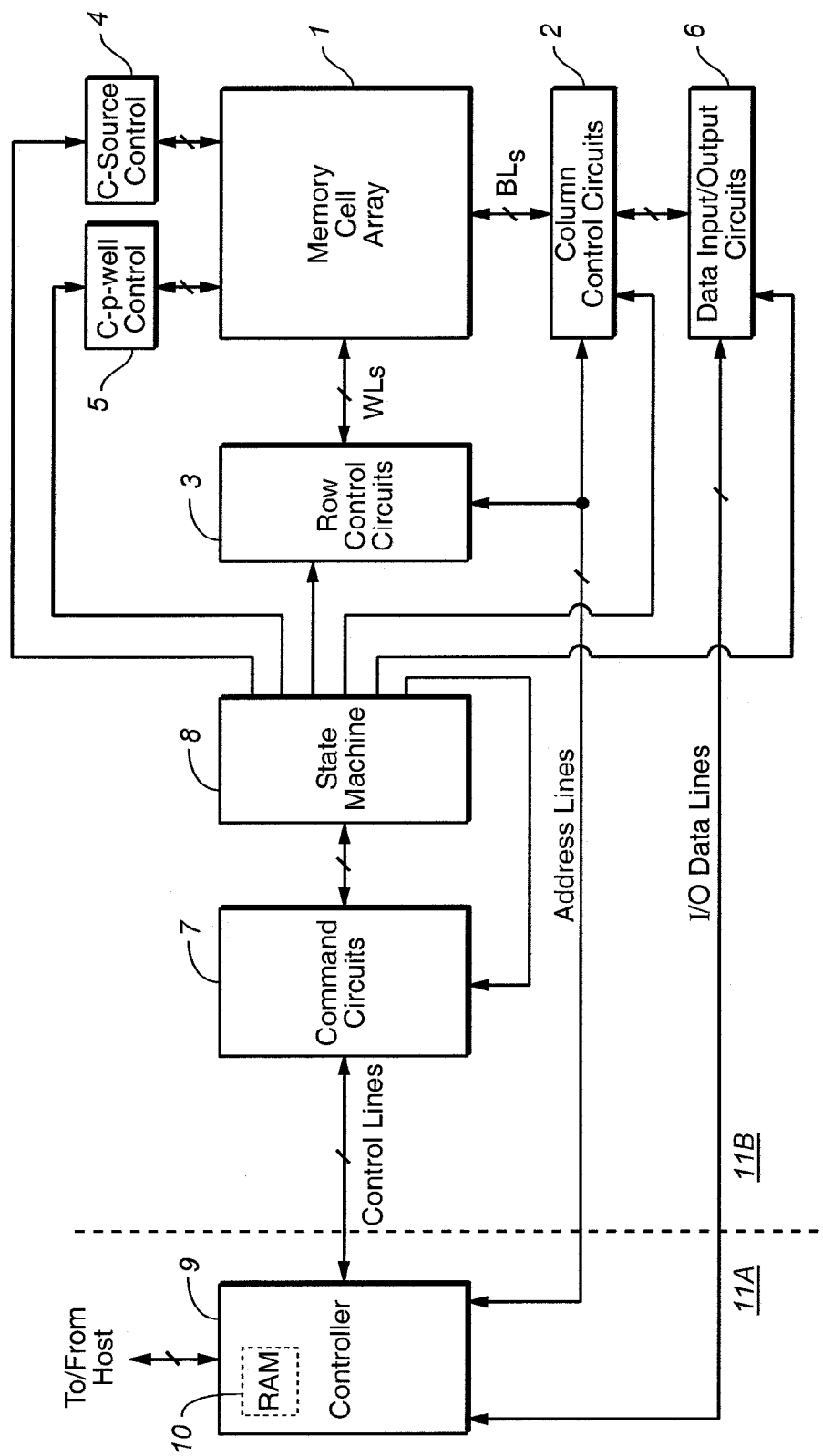
FIG. 1 shows a memory system including a memory cell array and a controller.

An exemplary memory system in which the various aspects of the present invention may be implemented is illustrated by the block diagram of FIG. 1. A memory cell array 1 including a plurality of memory cells arranged in a matrix is controlled by column control circuits 2, row control circuits 3, a c-source control circuit 4 and a c-p-well control circuit 5. The memory cell array 1 is, in this example, of the NAND type that is described above in the Background and in references incorporated herein by reference. Other types of nonvolatile memory may also be used. Column control circuits 2 are connected to bit lines (BL) of the memory cell array 1 for reading data stored in the memory cells, for determining a state of the memory cells during a program operation, and for controlling potential levels of the bit lines (BL) to promote the programming or to inhibit the programming. Row control circuits 3 are connected to word lines (WL) to select one of the word lines (WL), to apply read voltages, to apply program voltages combined with the bit line potential levels controlled by column control circuits 2, and to apply an erase voltage coupled with a voltage of a p-type region (cell P-well) on which the memory cells are formed. The c-source control circuit 4 controls a common source line connected to the memory cells. The c-p-well control circuit 5 controls the cell P-well voltage.

The data stored in the memory cells are read out by the column control circuit 2 and are output to external I/O lines via an I/O line and data input/output circuits 6. Program data to be stored in the memory cells are input to data input-output circuits 6 via the external I/O lines, and transferred to column control circuit 2. The external I/O lines are connected to a controller 9. Controller 9 includes various types of registers and other memory including a volatile random-access-memory (RAM) 10.

Command data for controlling the flash memory device are inputted to command circuits 7 connected to external control lines that are connected with controller 9. The command data informs the flash memory of what operation is requested. The input command is transferred to a state machine 8 that controls column control circuit 2, row control circuits 3, c-source control circuit 4, c-p-well control circuit 5 and the data input/output buffer 6. The state machine 8 can output a status data of the flash memory such as READY/BUSY or PASS/FAIL.

Controller 9 is connected or connectable with a host system such as a personal computer, a digital camera, or a personal digital assistant. It is the host that initiates commands, such as to store or read data to or from memory array 1, and provides or receives such data, respectively. Controller 9 converts such commands into command signals that can be interpreted and executed by command circuits 7. Controller 9 also typically contains buffer memory for the host data being written to or read from the memory array. A typical memory system includes one integrated circuit chip 11A that includes controller 9, and one or more integrated circuit chips 11B that each contains a memory array and associated control, input/output and state machine circuits. It is possible to integrate the memory array and controller circuits of a system together on one or more integrated circuit chips.

The memory system of FIG. 1 may be embedded as part of the host system, or may be included in a memory card that is removably insertible into a mating socket of a host system. Such a card may include the entire memory system, or the controller and memory array, with associated peripheral circuits, may be provided in separate cards. Several card implementations are described, for example, in U.S. Pat. No. 5,887,145, which patent is expressly incorporated herein in its entirety by this reference.

Figure 2A:
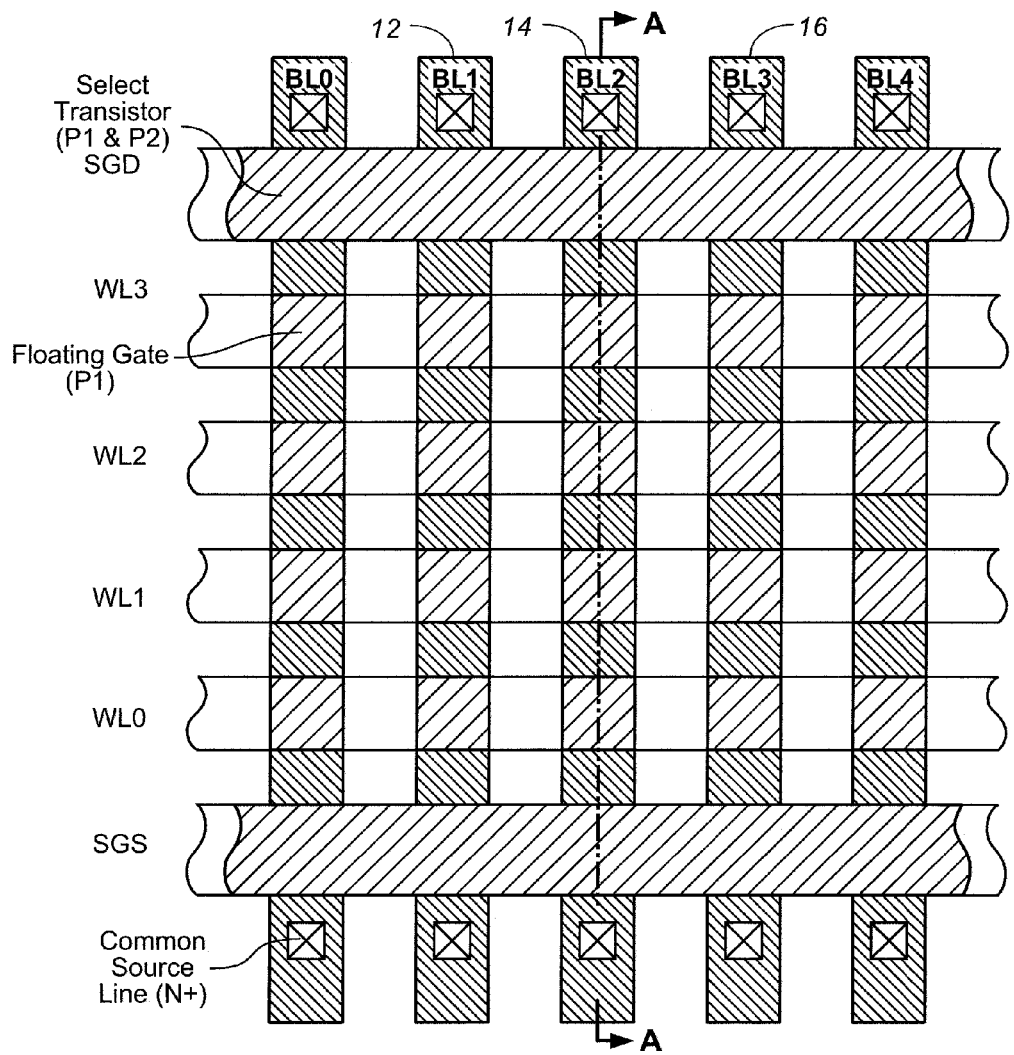
FIG. 2A illustrates the organization of the NAND memory cell array of FIG. 1.

One popular flash EEPROM architecture utilizes a NAND array, wherein a large number of strings of memory cells are connected through one or more select transistors between individual bit lines and a reference potential. A portion of NAND memory cell array 1 of FIG. 1 is shown in plan view in FIG. 2A. BL0-BL4 (of which BL1-BL3 are also labeled 12-16) represent diffused bit line connections to global vertical metal bit lines (not shown). Although four floating gate memory cells are shown in each string, the individual strings typically include 16, 32 or more memory cell charge storage elements, such as floating gates, in a column. Word lines labeled WL0-WL3 (labeled P2 in FIG. 2B, a cross-sectional along line A-A of FIG. 2A) and string selection lines SGD and SGS extend across multiple strings over rows of floating gates. However, for select transistors 40 and 41, the control gate and floating gate may be electrically connected (not shown). The control gate lines are typically formed over the floating gates as a self-aligned stack, and are capacitively coupled with each other through an intermediate dielectric layer 19, as shown in FIG. 2B. The top and bottom of the string connect to the bit line and a common source line respectively, commonly through a transistor using the floating gate material (P1) as its active gate electrically driven from the periphery. This capacitive coupling between the floating gate and the control gate allows the voltage of the floating gate to be raised by increasing the voltage on the control gate coupled thereto. An individual cell within a column is read and verified during programming by causing the remaining cells in the string to be turned on by placing a relatively high voltage on their respective word lines and by placing a relatively lower voltage on the one selected word line so that the current flowing through each string is primarily dependent only upon the level of charge stored in the addressed cell below the selected word line. That current typically is sensed for a large number of strings in parallel, thereby to read charge level states along a row of floating gates in parallel.

Figure 3A:
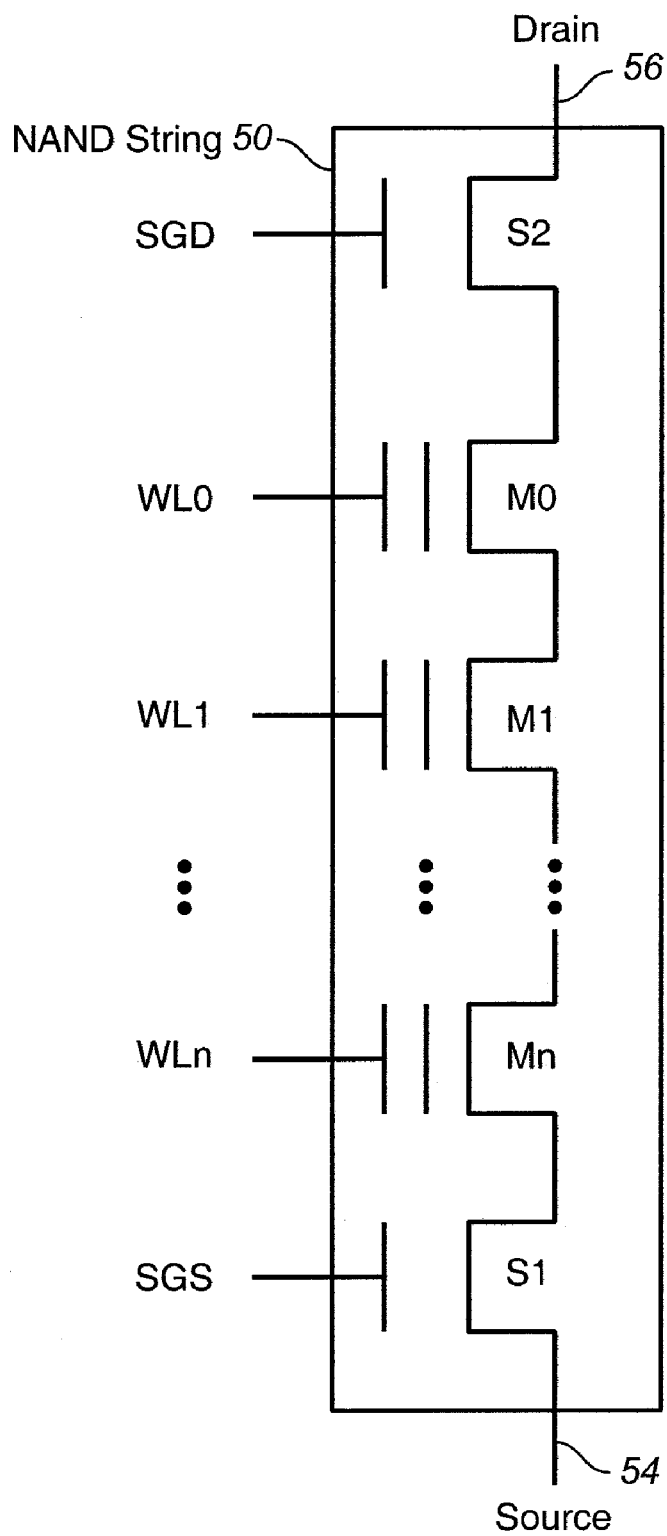
FIG. 3A shows a NAND string having n memory cells M0-Mn.

FIG. 3A shows a circuit diagram of a NAND string 50 having floating gate memory cells M0, M1, M2 . . . Mn. Memory cells M0, M1, M2 . . . Mn are controlled by control gates formed by word lines WL0, WL1 . . . WLn. In addition, a select gate (SGS) controls select transistor S1 that connects NAND string 50 to a source connection 54. Another select gate (SGD) controls select transistor S2 that connects NAND string 50 to a drain connection 56. The number of cells in NAND string 50 may be 4 as shown in FIG. 2B or may be some other number, such as 8, 16, 32 or more.

Figure 3B:
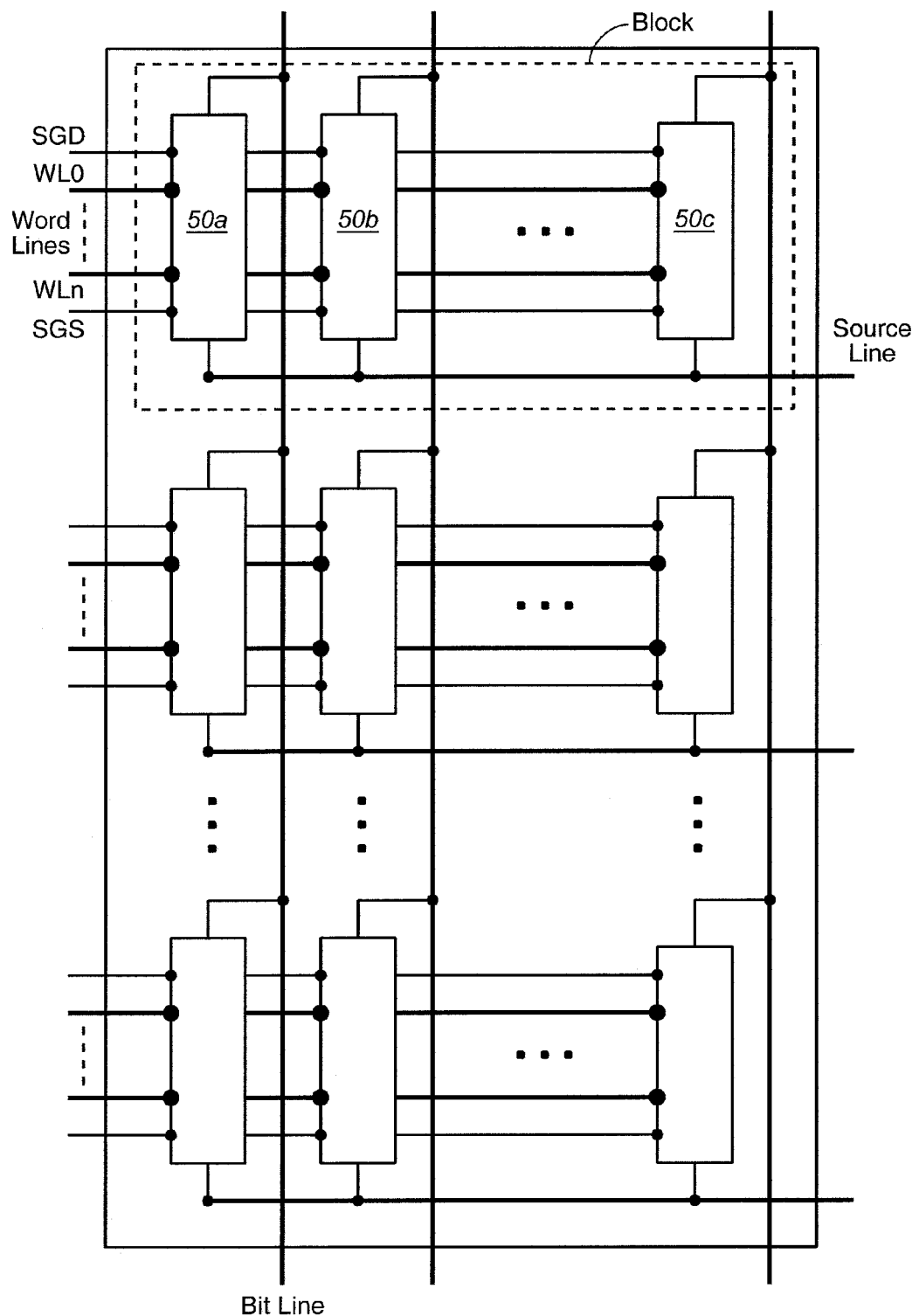
FIG. 3B shows a portion of a memory array comprised of multiple NAND strings including NAND strings 50a, 50b . . . 50c, which form a block.

FIG. 3B is a circuit diagram showing how NAND strings may be connected to form a portion of a memory array. NAND strings 50a, 50b . . . 50c are connected together to form a block. Each of NAND strings 50a, 50b . . . 50c has the same structure as NAND string 50 of FIG. 3A. NAND strings 50a, 50b . . . 50c may include many strings. In one example, a block in a NAND memory may contain 16,384 strings. NAND strings 50a, 50b . . . 50c share common word lines WL0, WL1 . . . WLn and select lines SGS and SGD. NAND strings 50a, 50b . . . 50c are erased together and thus form a block. In addition, NAND strings 50a, 50b . . . 50c share a common source line. Bit lines connect to the drain sides of NAND strings of different blocks. Data are generally programmed into a NAND array in units of a page. In a NAND array, a page may be formed by the memory cells connected by a single word line. Data are generally programmed into a block sequentially, page by page, with one word line being selected at a time. Bit lines have voltages representing data to be programmed. In some memories, more than one bit is programmed in each memory cell. In such memories, the data stored in the memory cells of a word line may be considered as upper page data and lower page data, corresponding to four voltage ranges designating two bits. In some memories, overhead data are stored in the same block as host data. A portion of a block may be dedicated to storing overhead data. So, for example, NAND strings 50a and 50b may store host data while NAND string 50c stores overhead data.

Figure 4:
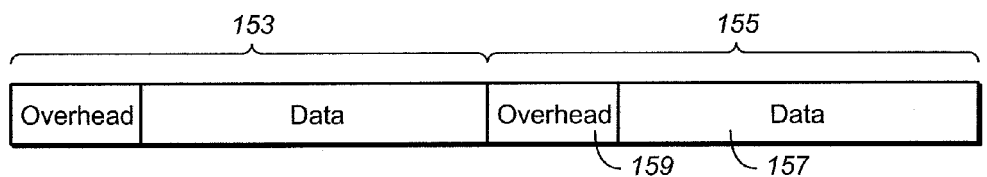
FIG. 4 shows an example of a page containing two sectors of host data and overhead data.

The size of the individual pages of FIG. 3B can vary but one commercially practiced form includes one or more sectors of data in an individual page. The contents of such a page having two sectors 153 and 155, each with overhead data, are illustrated in FIG. 4. More than two sectors may be stored in a page in other examples. Host data 157 are typically 512 bytes. In addition to the host data 157 are overhead data 159 that may include ECC data calculated from the host data, parameters relating to the sector data and/or the erase block in which the sector is programmed and an ECC calculated from the parameters and any other overhead data that might be included. In some examples, overhead data for a sector of host data are stored in a physical location adjacent to the host data. In other examples, the overhead data for a page are stored together in an overhead data area of the page.

Overhead data may include a quantity related to the number of program/erase cycles experienced by the erase block, this quantity being updated by the controller after each cycle or some number of cycles. When this experience quantity is used in a wear leveling algorithm, logical block addresses are regularly re-mapped by the controller to different physical block addresses in order to even out the usage (wear) of all the erase blocks.

Overhead data may also include an indication of the bit values assigned to each of the storage states of the memory cells, referred to as their "rotation". This also has a beneficial effect in wear leveling. One or more flags may also be included in overhead data that indicate status or states. Indications of voltage levels to be used for programming and/or erasing the erase block can also be stored within the overhead data, these voltages being updated as the number of cycles experienced by the erase block and other factors change. Other examples of the overhead data include an identification of any defective cells within the erase block, the logical address of the data that are mapped into this physical block and the address of any substitute erase block in case the primary erase block is defective. The particular combination of parameters stored in overhead data that are used in any memory system will vary in accordance with the design. Generally, the parameters are accessed by the controller and updated by the controller as needed.

Figure 5:
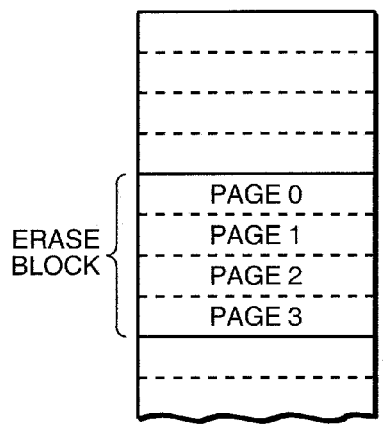
FIG. 5 shows an erase block containing four pages.

FIG. 5 shows an erase block in a NAND memory array. The erase block, a minimum unit of erase, contains four pages 0-3, each of which is the minimum unit of programming. One or more host sectors of data are stored in each page, along with overhead data including at least the ECC calculated from the sector's data and may be in the form of the data sectors of FIG. 4. Each page of the erase block is formed by a word line extending across NAND strings and the NAND strings of the erase block share source and drain select lines.

Figure 6A:
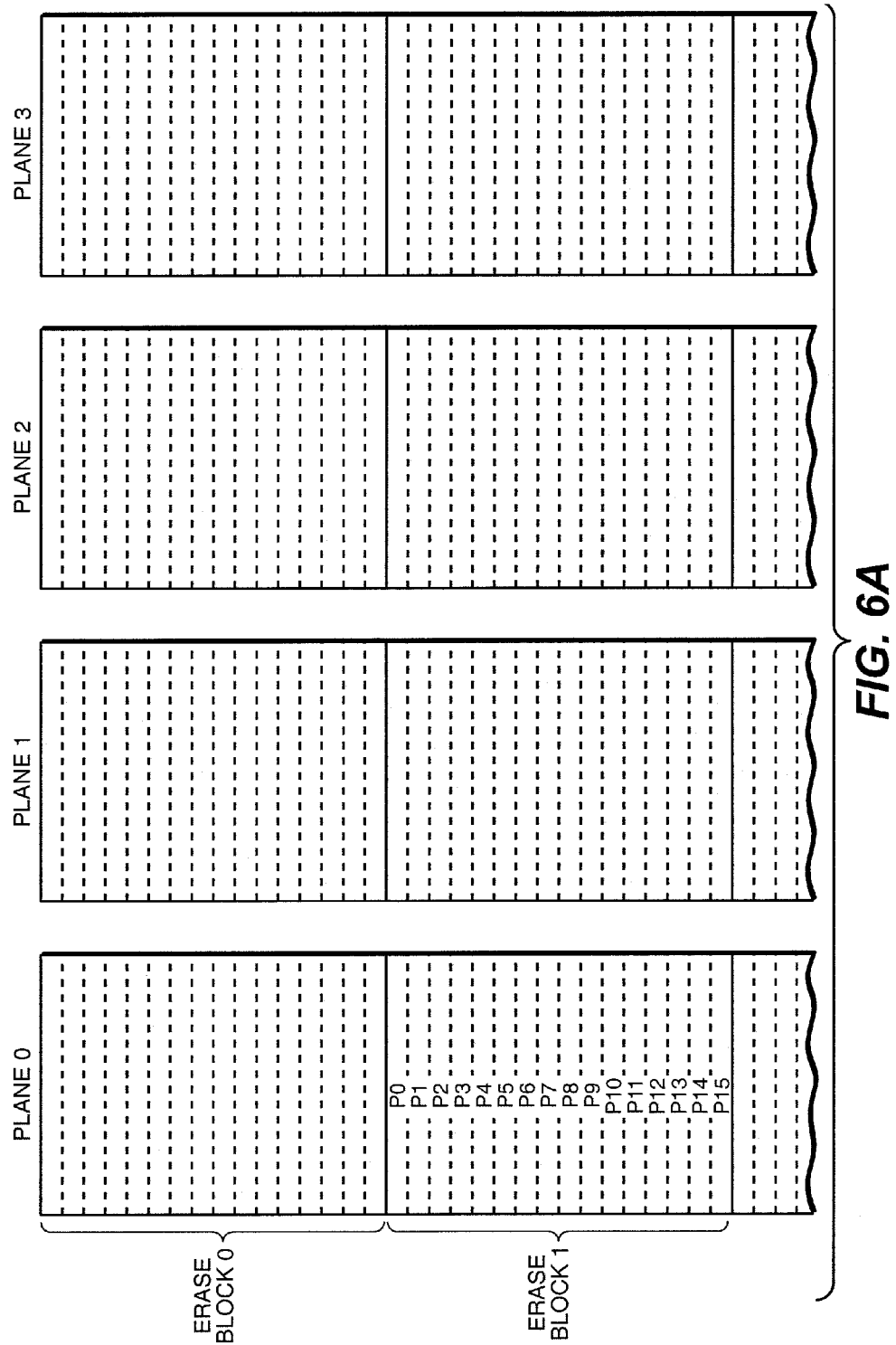
FIG. 6A shows a memory array having four planes, each plane having multiple blocks including erase block 0 and erase block 1, erase bock 1 of plane 1 containing pages P0-P15.

A further multi-sector erase block arrangement is illustrated in FIG. 6A. Here, the total memory cell array is physically divided into two or more planes, four planes 0-3 being illustrated. Each plane is a sub-array of memory cells that has its own data registers, sense amplifiers, addressing decoders and the like in order to be able to operate largely independently of the other planes. All the planes may be provided on a single integrated circuit device or on multiple devices, an example being to form each plane from one or more distinct integrated circuit devices. Each erase block in the example system of FIG. 6A contains 16 pages P0-P15, each page having a capacity of one, two or more host data sectors and some overhead data.

Figure 6B:
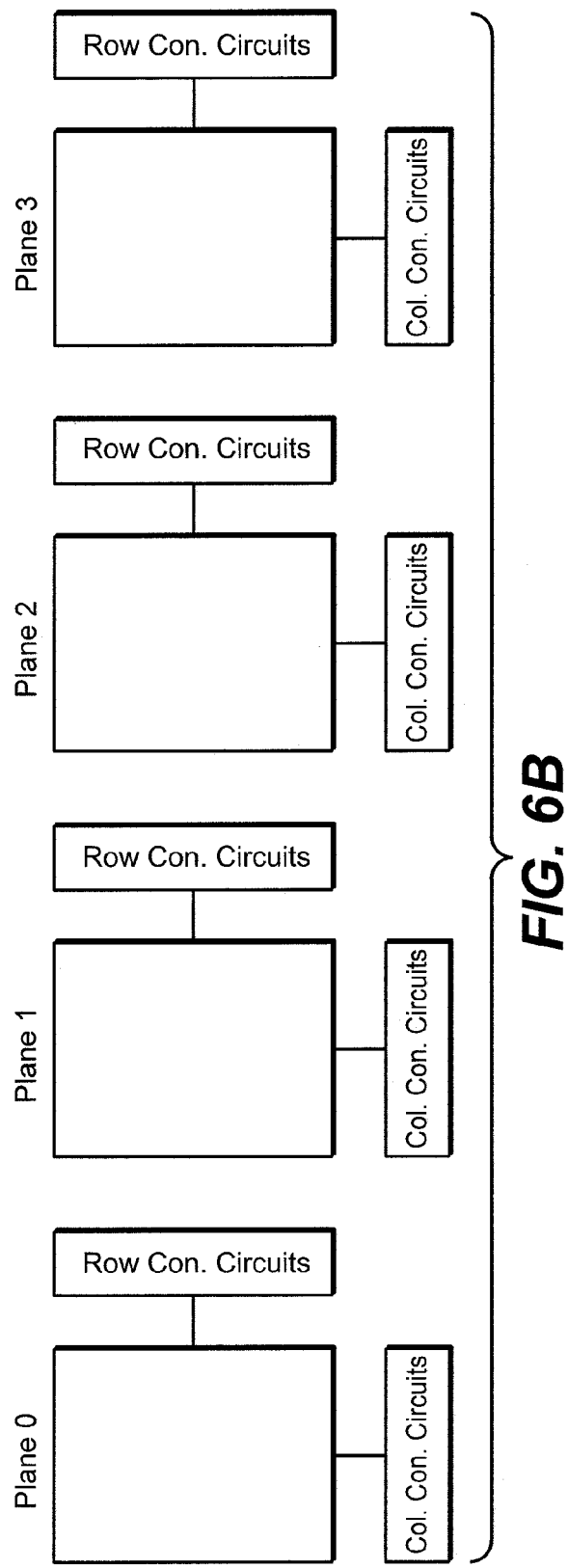
FIG. 6B shows the memory array of FIG. 6A with each plane having dedicated row control circuits and column control circuits.

FIG. 6B shows planes 0-3 of FIG. 6A, with dedicated row control circuits and dedicated column control circuits for each plane. A single chip may have multiple planes of a memory array on it. In addition, multiple chips may be connected together to form an array. A single controller may be used to manage data in all the planes of the memory array. Typically, the controller is located on a separate chip.

Figure 7:
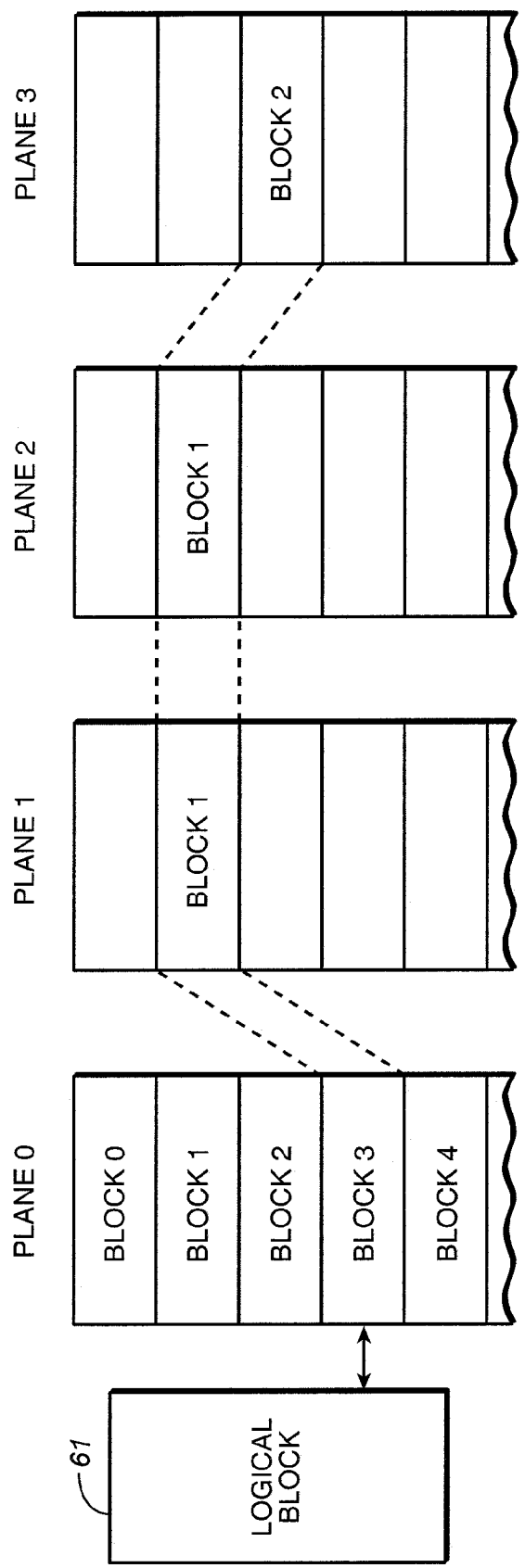
FIG. 7 shows an example of parallel programming of blocks in plane 0-plane 3 during programming of a metablock.

Yet another memory arrangement is illustrated in FIG. 7. Each plane contains a large number of erase blocks. In order to increase the degree of parallelism of operation, erase blocks within different planes are logically linked to form metablocks. One such metablock is illustrated in FIG. 7. Each metablock is logically addressable and the memory controller assigns and keeps track of the erase blocks that form the individual metablocks. The host system provides data in the form of a stream of sectors. This stream of sectors is divided into logical blocks. Here, a logical block is a logical unit of data that contains the same number of sectors of data as are contained in a metablock of the memory array. The memory controller maintains a record of the location where each logical block is stored. Such a logical block 61 of FIG. 7, for example, is identified by a logical block addresses (LBA) that is mapped by the controller into the physical block numbers (PBNs) of the blocks that make up the metablock. All blocks of the metablock are erased together, and pages from each block are generally programmed and read simultaneously. Pages of different planes that are programmed or read together in this way may be considered to form a metapage.

Figure 8:
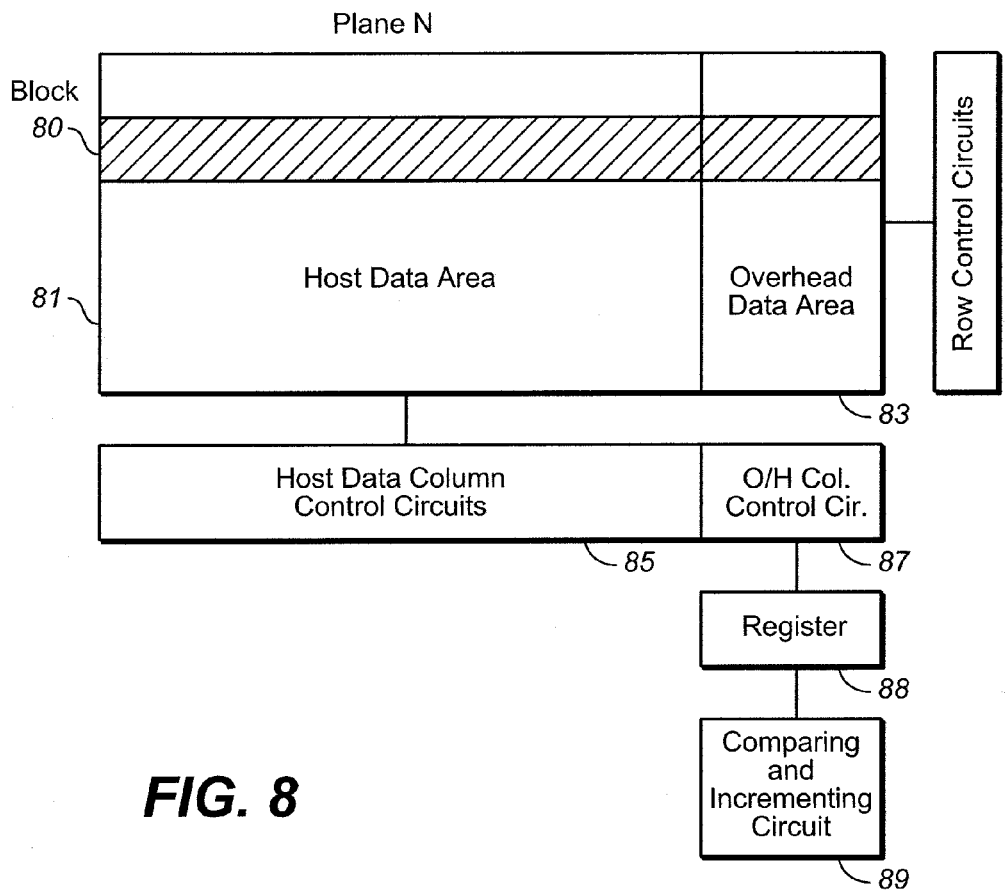
FIG. 8 shows a memory array and peripheral circuits including row and column control circuits, a register and a comparing and incrementing circuit.

FIG. 8 shows an example of a block 80 in Plane N that has a host data area 81 for storage of host data and an overhead data area 83 for storage of overhead data. Host data area 81 may be used for storage of data sent by the host including user data and data generated by the host for managing the memory such as File Allocation Table (FAT) sectors. Host data area 81 is formed by a first set of columns that have a first set of column control circuits 85. Overhead data area 83 is formed by a second set of columns that have a second set of column control circuits 87. The number of columns provided for overhead data depends on what overhead data is to be stored. In addition, redundant columns may be provided so that defective columns can be replaced if needed. Column control circuits 85, 87 include circuits for reading the voltage on a bit line to determine the state of a memory cell in the memory array. Column control circuits also include circuits for providing voltages to bit lines according to memory states to be programmed to memory cells. Generally, overhead data area 83 is not accessed by the host. The controller accesses overhead data area 81 and stores data there that the controller uses in managing data in the memory array.

FIG. 8 shows a register 88 connected to overhead column control circuits 87 and a comparing and incrementing circuit 89 connected to register 88. In one embodiment, overhead column control circuits 87 read a hot count from overhead data area 83 of block 80 and store the hot count value in register 88 prior to erasing block 80. Comparing and incrementing circuit 89 then performs a comparison between the hot count value and one or more predetermined values and makes a determination based on this comparison. In one example, the hot count value may be compared with a predetermined value to determine if the number of erase operations indicated by the hot count value exceeds a threshold number that indicates that the block is at or close to a wear-out condition. In one example, the threshold value is 100,000, though other higher or lower values may also be used. When the number of erase operations exceeds this threshold, block 80 may be disabled and indicated to be no longer available for storage of data. If the number of erase operations does not exceed the threshold number, then the comparison and incrementing circuits 89 increment the hot count value in register 88. Block 80 is erased and then the incremented hot count value is written back to overhead data area 83 of block 80 by overhead column control circuits 87. In one example, register 88 holds three bytes of data, which is sufficient for a hot count value up to the threshold number. The hot count portion of the overhead data area also holds three bytes in this case. In contrast to certain prior systems of maintaining a hot count value, this embodiment does not require the controller to manage hot count values for different blocks. Instead, the hot count value is maintained by dedicated circuits that are peripheral circuits of the plane that contains the block. This reduces the burden on the controller and on the communication lines between peripheral circuits of the memory and the controller so that the controller may perform other functions and operate faster. In addition, maintaining a hot count in the block using on-chip circuits reduces the risk that the hot count will be lost due to an unexpected loss of power as may occur where a controller maintains a hot count in volatile RAM. When a block exceeds the threshold value, this may be indicated to the controller so that the controller does not subsequently attempt to access the block. Otherwise, this routine may proceed independently of the controller.

In one embodiment, a hot count is initialized to a value that is non-zero. This may be done at the factory, for example as part of a test and configuration procedure after memories are manufactured. For example, one bit may be set to "1" initially. If the hot count is later read as being all "0"s or all "1"s, this indicates an error. This may happen if power is lost during programming of the hot count to the overhead data area.

In one embodiment, the hot count value may be compared with one or more predetermined values that indicate a level or levels of wear that are less than a wear out condition. In some memories, the characteristics of memory cells may change as they wear. In such memories, it may be beneficial to change certain operating conditions as the memory cells wear. Thus, a first set of operating conditions may be selected for a block that has experienced less than a first threshold number of erase operations. A second set of operating conditions may be selected when the block has experienced more than the first threshold number of erase operations but less than a second threshold number of erase operations. A third set of operating conditions may be selected when the block has experienced more than the second threshold number of erase operations but less than a third threshold number of erase operations and so on. Different sets of operating conditions may be chosen as appropriate for different levels of wear. The operating conditions that are modified in this way may include programming voltages; number of programming pulses; duration of programming pulses; programming voltage increments from pulse to pulse; voltages used for self boosting during programming; erase voltage; assignment of threshold voltages to memory states; guardband size; timeout periods for program, erase and read operations; amount of ECC data per block; frequency of scrub operations; standby voltages and any other operating conditions. Changes to the operating conditions may be made independently of the controller. For example, the comparing and incrementing circuit may send a signal to command circuits that cause a state machine to use different operating conditions when accessing the memory array.

According to an embodiment of the present invention, data stored in the overhead portion of a block may be stored in a different format to data stored in a host data area of the block. While data in the host data area and some data in the overhead data area may be stored with ECC data that allows errors to be corrected, other data in the overhead data area may not have such ECC data. For example, a flag may be stored as a single bit of data and is not generally stored with any redundant data that would allow correction if the bit was corrupted. For such data, it may be beneficial to program in a more secure manner than that used for host data or overhead data that has ECC data. In some cases, no ECC is calculated for a hot count stored in the overhead data area of a block. Instead, the hot count is stored in binary format for increased reliability.

Figure 9A:
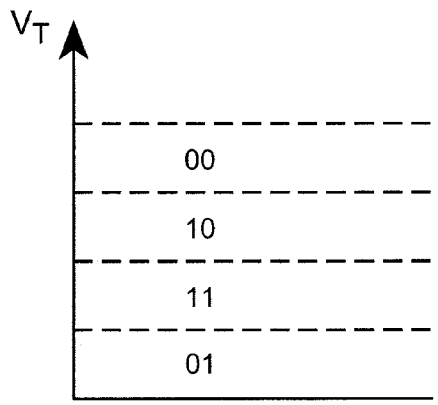
FIG. 9A shows four ranges for the threshold voltage of a memory cell representing four logical states.

In one embodiment, host data are stored in Multi Level Cell (MLC) format. In MLC format, four or more different logical states are designated by four or more different threshold voltage ranges for a cell. FIG. 9A shows an example where four ranges of threshold voltage ($V_T$) are assigned to four logical states 01, 11, 10, 00. The 01 state corresponds to an erased (unprogrammed) state and may include a negative threshold voltage range. In other examples, logical states may be represented by different threshold voltage ranges. In some examples, the assignment of voltage ranges to logical states is varied at different times. The ranges of threshold voltage corresponding to logical states may be discontinuous with guardbands provided between them to reduce the chance of a threshold voltage being disturbed so that the logical state of the memory cell changes from one state to another. In other examples, more than four logical states may be represented by different threshold voltages. MLC programming is typically used to store data in a host data area where high storage density is desired and errors may be corrected by ECC.

Figure 9B:
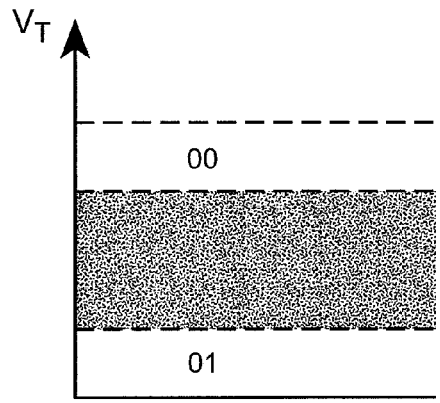
FIG. 9B shows two ranges for the threshold voltage of a memory cell representing two logical states.

FIG. 9B shows two threshold voltage ranges that represent two logical states of a memory cell in an overhead data area. The logical states correspond to the two logical states of FIG. 9A that have the biggest voltage difference. Thus, the threshold voltage ranges that are assigned to logical states 11 and 10 in FIG. 9A become part of a large guardband in the example of FIG. 9B and only logical states 01 and 00 remain (while the "01," and "00" notation is still used in FIG. 9B for comparison with FIG. 9A, only one bit is stored and the states may be considered as "1" and "0" states). This format allows programming with a very low risk of errors. A memory cell having a threshold voltage corresponding to state 01 in FIG. 9B would be unlikely to experience a disturbance causing it to have a threshold voltage corresponding to logical state 00. Programming may also be more rapidly completed where only two programming states are used. Programming a single bit of data in a cell with a large guardband may be considered "flag programming mode" because it is particularly suited to programming of flags. According to an embodiment of the present invention, a hot count that indicates the number of times a block has been erased is stored in flag programming mode even though host data (and in some cases, other overhead data such as ECC data) are stored in MLC mode.

FIG. 10 shows how on-chip circuits may respond to a controller command to erase a block according to an embodiment of the present invention. The controller sends an erase command identifying the block to be erased. The command is received 101 by on-chip circuits. This generally occurs when the controller determines that all the data in the block is obsolete. The hot count for the block is copied 103 from the overhead data area of the block where it is stored and is written into a register on the same chip. The hot count is compared 105 to a predetermined threshold value by a comparing circuit also on the same chip. The threshold value may be set at the factory to a number that is determined from experimental data correlating the number of erase operations and failure of a block. The threshold value is generally set in an irreversible manner at the factory, for example by using fuses or antifuses. If the hot count exceeds the threshold, then the block is disabled 107 and is generally flagged as being unavailable for storage of data. An indication may be sent to the controller that the erase operation on the block has failed and that that the block is not available for storage of data. The controller may record that the block is not available so that it does not attempt to access the block again. Generally, the controller will select another block at this stage and continue programming. Where the block that fails is being programmed in parallel with other blocks in other planes (for example, as part of a metablock) the failed block is replaced by another block in the same plane. If all blocks being programmed in parallel fail, the controller may abort the program operation. If the hot count value is less than the threshold, then the block (including an overhead data area containing the hot count) is erased 109 and the hot count in the register is updated 111 to reflect the additional erase operation. In one embodiment, the hot count is simply incremented by one to reflect an additional erase operation. In another embodiment, the hot count is not incremented every time an erase operation is performed. Instead, a random number generator is used to determine whether the hot count is incremented or not. In this way, the hot count is incremented less frequently, with the frequency depending on the random number generator in a predetermined manner. This allows a hot count to be stored using less space in the block. Examples of using such random number generators for updating hot count values are provided in U.S. Pat. No. 6,345,001. Once the hot count value is updated in the register, the updated hot count value is written back to the overhead data area of the block 113, which has been erased. Thus, the block contains a hot count that reflects the erase operation that has been performed. This hot count is maintained independently of the controller.

FIG. 11 shows a flowchart for another example of hot count that is updated during erase of a block and use of the hot count to manage the block. The controller sends an erase command identifying the block to be erased. This command is received 121 by on-chip circuits. The hot count for the block is copied 123 from the overhead data area of the block where it is stored and is written into a register on the same chip. The hot count is compared 125 to a predetermined threshold value in a comparing circuit also on the same chip. If the hot count value is greater than the threshold value then operating conditions for the block are modified 127 so that the block goes from operating in a first mode to operating in a second mode. Modifying operating conditions may involve modifying one or more voltages used in operation of the block or modifying one or more time out periods or modifying other parameters used in managing the block. In the present example, the hot count is compared to a single threshold so that when the hot count is less than the threshold, default operating conditions are used. After the erase count exceeds the threshold, a second set of operating conditions applies. In other examples, the hot count may be compared to two or more threshold values to determine which of three or more sets of operating conditions should be used. The block is erased 129 and the hot count value in the register is updated 131 whether operating conditions are modified or not. Then, the updated hot count value is programmed back to the overhead data area of the block 133. The process shown in FIG. 11 may be carried out on-chip without the controller so that the burden on the controller is reduced and the controller may perform other operations more rapidly. Modifying operating conditions may be done by peripheral circuits of the same plane as the block.

The embodiments described in FIGS. 10 and 11 are both carried out by circuits provided on-chip. In memories having multiple planes, each plane generally has a host data area and an overhead data area and each plane has a register and a comparing and incrementing circuit that allows each plane to carry out hot count update operations independently. While hot count update operations may be carried out independently of the controller, the controller may use such hot count values. For example, the controller may use hot count values maintained by on-chip circuits for wear leveling purposes.

While the various embodiments described above include features offering advantages over prior designs, it is generally desirable to maintain the capability to disable such features. This may be done for purposes of backward compatibility or for some other reason. In one embodiment, hot count circuits including a register and a comparing and incrementing circuit are enabled in a first mode and disabled in a second mode. In yet another mode, a hot count is maintained by the circuits but is not used to disable a block or to modify operating conditions of the block. Such a hot count may be used for test purposes, failure analysis or other purposes.

Although the invention has been described with respect to various exemplary embodiments, it will be understood that the invention is entitled to protection within the full scope of the appended claims.

What is claimed is:

1. A flash memory array comprising:
   a memory chip comprising a plurality of planes, each one of the plurality of planes having dedicated row and column decoder circuits, each plane having one or more blocks, each plane of the plurality of planes having a register, each plane having an incrementing circuits, and each plane having a comparing circuit; and
   a controller chip comprising a memory controller that is in communication with the memory chip, the memory controller requests the memory chip to erase one or more of the blocks;
   the register for a first plane of the planes receives a hot count from a first block of the one or more blocks for the first plane, the hot count indicating the number of times the first block has been erased;

the incrementing circuit for the first plane increments the contents of the register for the first plane in response to a request from the memory controller to erase the first block; and the comparing circuit for the first plane compares the contents of the register for the first plane with a predetermined value.

2. The memory array of claim 1 wherein the register is initialized to a non-zero number.

3. The memory array of claim 1 wherein an incremented hot count value is written back to the first block.

4. The memory array of claim 1 wherein host data stored in the first block is stored with two or more bits per memory cell and the hot count is stored with only one bit per cell.

5. The memory array of claim 1 wherein the first block includes a host data area and an overhead data area, the hot count stored in the overhead data area.

6. The memory array of claim 1 wherein the comparing circuit provides a signal to the memory controller in response to the comparing, the signal indicating that the first block is not for further use.

7. The memory array of claim 1 wherein the comparing circuit provides a signal in response to the comparing, the signal causing one or more operating conditions of the first block to be modified.

8. The memory array of claim 1, wherein the comparing circuit for the first plane compares the contents of the register for the first plane with the predetermined value in response to the memory chip receiving the request from the memory controller to erase the first block.

9. The memory array of claim 8, wherein the first plane further includes dedicated circuitry that reads the hot count from the first block in response to the memory chip receiving the request from the memory controller to erase the first block.

10. A NAND flash memory array having a page as the unit of programming and a block as the unit of erase, a block containing two or more pages, comprising:

a block having a host data area and an overhead data area, the overhead data area containing a hot count that records the number of times the block has been erased, the block located on a first substrate;

a comparing circuit that compares the hot count with a threshold value, the comparing circuit on the first substrate; and a controller on a second substrate, the controller managing data storage in the memory array.

11. The NAND flash memory array of claim 10 wherein the comparing circuit is connected to a first plane of the memory array, additional planes of the memory array connected to additional comparing circuits on the first substrate.

12. The NAND flash memory of claim 10 further comprising a register on the first substrate that holds the hot count for comparing with the threshold value, the hot count incremented in the register.

13. The NAND flash memory of claim 10 wherein the host data area contains host data stored with two or more bits per memory cell and the overhead data area contains data stored with only one bit per memory cell.

14. The NAND flash memory of claim 10 wherein the comparing circuit sends a signal in response to comparing the hot count with the threshold value, the signal indicating a change at least one operating condition of the block.

15. The NAND flash memory array of claim 10 wherein:

the controller on the second substrate issues an erase command to the first substrate to request that the block be erased; and the comparing circuit on the first substrate compares the hot count with the threshold value in response to the erase command.

16. The NAND flash memory array of claim 15 wherein the first substrate further includes dedicated circuitry that reads the hot count from the block in response to the first substrate receiving the erase command.

17. The NAND flash memory array of claim 16, wherein the dedicated circuitry increments the hot count value and writes the incremented hot count value to the block if the hot count value does not exceed the predetermined value, and the dedicated circuitry records that the block is not for subsequent storage of data if the hot count value exceeds the predetermined value.

18. The NAND flash memory array of claim 17, wherein the dedicated circuitry informs the controller on the second substrate that the block is not for subsequent storage of data if the hot count value exceeds the predetermined value.

* * * * *

UNITED STATES PATENT AND TRADEMARK OFFICE
CERTIFICATE OF CORRECTION

PATENT NO. : 7,467,253 B2  Page 1 of 1
APPLICATION NO. : 11/404454
DATED : December 16, 2008
INVENTOR(S) : Yero It is certified that error appears in the above-identified patent and that said Letters Patent is hereby corrected as shown below:

Col. 12, line 58: After "incrementing" and before "and" delete "circuits," and substitute therefore --circuit,--

Signed and Sealed this

Twenty-third Day of June, 2009

JOHN DOLL
*Acting Director of the United States Patent and Trademark Office*